Aug. 4, 1964        D. L. KLASS        3,142,978

MOTION TRANSMITTING APPARATUS

Filed Jan. 8, 1962        2 Sheets-Sheet 1

INVENTOR.
DONALD L. KLASS
BY Edward R. Lang
ATTORNEY

Aug. 4, 1964  D. L. KLASS  3,142,978
MOTION TRANSMITTING APPARATUS
Filed Jan. 8, 1962  2 Sheets-Sheet 2

INVENTOR.
DONALD L. KLASS
BY Edward H. Lang
ATTORNEY

United States Patent Office 3,142,978
Patented Aug. 4, 1964

3,142,978
MOTION TRANSMITTING APPARATUS
Donald L. Klass, Barrington, Ill., assignor to Pure Oil Company, Chicago, Ill., a corporation of Ohio
Filed Jan. 8, 1962, Ser. No. 164,859
12 Claims. (Cl. 73—12)

This invention relates to an apparatus for the rapid direction-reversal of rotary motion, and is particularly adapted for use as a shock-shaking or shock-mixing device.

With the advent of various high-acceleration devices, the components of which are subjected to severe shock and vibration, methods of determining the stability and durability of mechanical and electrical devices under shock are becoming increasingly important. Prior art means for subjecting objects to shock have proved to be less than satisfactory because of the difficulty of constructing a test apparatus capable of subjecting the object to be tested to rapid acceleration and deceleration. Particularly lacking has been a suitable device by which the object to be tested can be subjected to accelerations and decelerations occurring at various frequencies, ranging from low frequencies up through the ultrasonic range. The shock-testing of sensitive devices covering a wide range of frequencies is important because a device capable of sustaining severe shock without damage may fail from the application of considerably less severe shock, where the less severe shock is applied at a frequency corresponding to the natural frequency of one of the components of the device tested.

It is an object of this invention to provide an apparatus for subjecting an object to be tested to rapid acceleration and deceleration. Another object of this invention is to provide a simple and easy-to-operate apparatus by which a test object can be subjected to accelerating and decelerating forces applied at any selected frequency over a wide range of frequencies.

The invention is described with reference to the drawings, of which,

Figure 1:
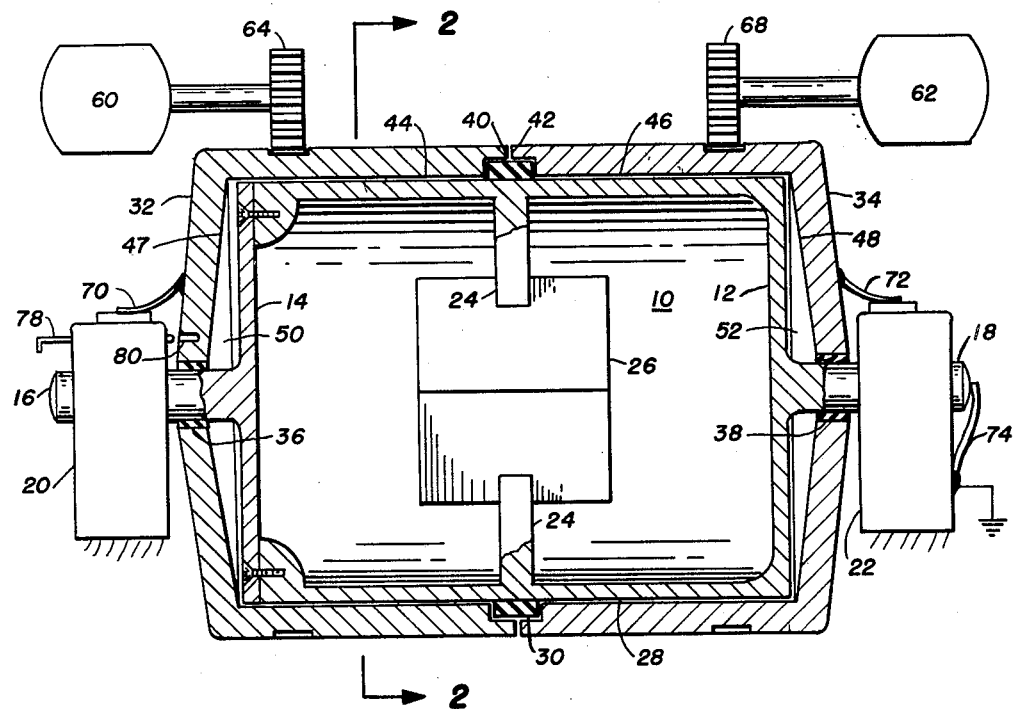
FIGURE 1 is an elevational view, in section, of the apparatus of this invention.
Figure 2:
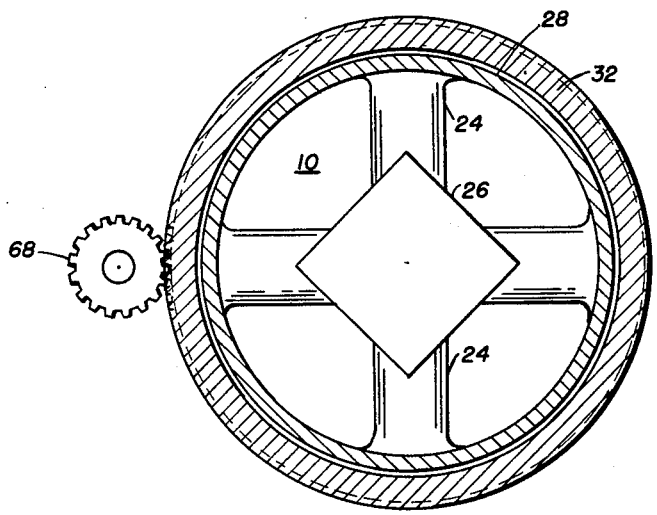
FIGURE 2 is a sectional view in the plane 2—2 of FIGURE 1.

Referring to FIGURE 1, drum 10 includes a cup-shaped portion 12 and a cover portion 14. The drum is provided with trunnions 16 and 18, by means of which the drum is rotatably supported by bearings 20 and 22. The drum is provided with support means 24 for securing a test object 26 firmly in position within the drum; test object 26 can be a bucket for paint etc., also for containing solid objects for shock. Drum 10, which is fabricated of steel, is further provided with a cylindrical peripheral surface 28, and a ring-shaped bearing 30 which is fabricated of an electrically-insulating material suitable for use as a bearing, such as nylon or Teflon. Bearing 30 is secured to the periphery 28 of the drum. Cup-shaped coupling members 32 and 34 are rotatably supported with respect to trunnions 16 and 18 by bearings 36 and 38, which similarly are fabricated of an electrically-insulating bearing material. The cup-shaped coupling members 32 and 34 are supported at their open ends by bearing 30, and shaped to provide circular, spaced, open ends at 40 and 42. Coupling members 32 and 34 are provided with interior clutching surfaces 44 and 46, respectively, which are arranged in spaced relationship with the periphery 28 of drum 10. The space between the periphery of the drum 10 and the surfaces 44 and 46 is preferably about 0.002 to 0.20 inch. The distance between adjacent ends 40 and 42 of the coupling members 32 and 34 is preferably about 0.002 to 0.20 inch. The coupling members are shaped at 47 and 48 to provide reservoirs 50 and 52 at each end of drum 10.

Electric motors 60 and 62 are provided with gears 64 and 68 which meet with mating gears provided in the periphery of coupling members 32 and 34, the motors being adapted to drive the coupling members in opposite directions. The coupling members are fabricated of steel, and brushes 70 and 72 are provided so that an electric potential can be applied to the coupling members. Brush 74, which contacts trunnion 18, is connected to ground and serves to ground drum 10. A key 78 is provided in bearing 20 to mate with opening 80 in coupling member 32, so that the coupling member can be locked in position to prevent rotation thereof.

Bearing 20 is preferably removably mounted so that it can be removed from around trunnion 16. This permits removal of coupling member 32 and cover plate 14 for insertion of a test object 26, and adjustment of the test-object supporting means 24. In operation, an electric field responsive fluid (sold under the trademark of Electro Fluid is disposed in spaces 50 and 52 of the assembled apparatus. Motors 60 and 62 are energized to rotate the coupling members 32 and 34 in opposite directions. Electric potential is then applied alternately between couple member 32 and drum 10, and between coupling member 34 and drum 10. The action of the electric field responsive fluid, as is well known, is to provide an effective coupling between the coupling members and the drum when electric potential is applied. Since the clutching action of the electric field responsive fluid occurs only during the instant that electric potential is applied across the electric field responsive fluid film, alternate energizing of the two electric field responsive fluid couplings provided by the coupling members 32 and 34, in cooperation with the drum 10, will cause the drum 10 to rotate first in one direction, and then in the other, since the coupling members 32 and 34 are rotating in opposite directions. Since the coupling members 32 and 34 are rotated continuously, centrifugal force applied to the electric field responsive fluid by the rotation of the coupling members will force the electric field responsive fluid outwardly from spaces 50 and 52 to provide a continuous film between the surfaces 44 and 46 of the coupling members and the periphery 28 of the drum. In the preferred operation of the apparatus, an electric potential will always be applied to either brush 70 or brush 72, and the drum will be grounded by brush 74. It is preferred that the coupling members be grounded during the period when they are not energized, thus, for example, coupling member 32 will alternately be energized by the application of an electric potential, or will be grounded. Similarly, coupling member 34 will alternately be energized by an electric potential, or grounded. Thus there will be at all times a potential difference between one of the coupling members and the drum, and also there will always be an electric potential between the two coupling members. This latter feature provides an effective oil seal at the open ends of the coupling members at 40 and 42. The effect of the potential difference between the coupling members is to render viscous the electric field responsive fluid between the open ends 40 and 42, whereby leakage of the electric field responsive fluid under the influence of centrifugal force is avoided. Since the surface area provided at the seal is very small, the effective power loss due to electric field responsive fluid coupling effect will be very small. This power loss may further be minimized by providing the open ends of the coupling members with very smooth, ground surfaces.

The applied potential may be either A.C. or D.C., depending upon the electric field responsive fluid selected. The electric field responsive fluids themselves, as well as their properties, are well known in the art and form no part of this invention.

Figure 3:
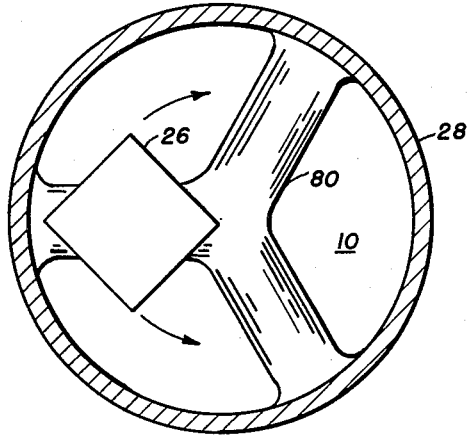
FIGURE 3 is a sectional view showing an alternate support for the test object.
Figure 4:
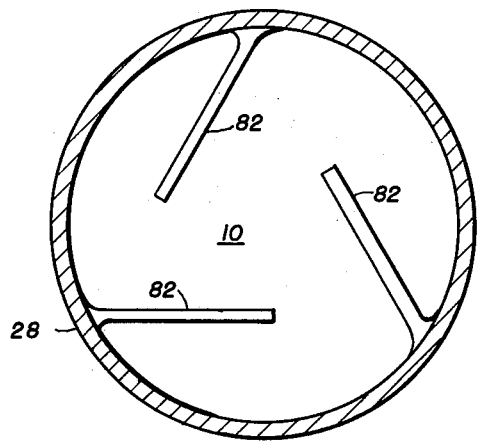
FIGURE 4 is a sectional view showing an adaptation of the drum for use as a mixing vessel.

FIGURE 3 shows a modification of the apparatus of FIGURE 1 wherein the test object 26 is supported eccentrically with respect to the drum 10. Suitable support means 80 is provided. In this embodiment, the test object is subjected to an oscillatory rather than a rotary pattern of movement. FIGURE 4 shows a modification of the apparatus of FIGURE 1 wherein the drum 10 is adapted for use as a mixing vessel. A plurality of vanes 82 are provided within the drum. Rotation can be in either a horizontal or vertical plane.

Figure 5:
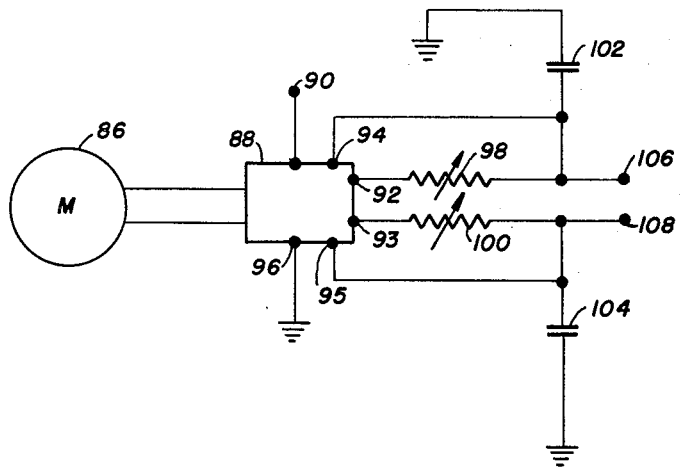
FIGURE 5 is a schematic diagram of an electric circuit for use in conjunction with the apparatus of this invention.

Various means may be employed for alternately energizing the coupling members 32 and 34. A schematic sketch of one such means is shown in FIGURE 5. Variable-speed motor 86 drives rotary switch 88, which is of the double-throw variety, and acts to connect input terminal 90 alternately to output terminals 92 and 93. Similarly, the switch acts to connect grounded terminal 96 alternately to output terminals 94 and 95. Thus when output terminal 92 is connected to input terminal 90, output terminal 95 is connected to grounded terminal 96, and when output terminal 93 is connected to input terminal 90, output terminal 94 is connected to grounded terminal 96. Where a direct-current potential is employed, it is preferred to incorporate in the circuit two variable resistances, 98 and 100, and two capacitors, 102 and 104. Filter output terminals 106 and 108 are then connected to brushes 70 and 72 of the apparatus of FIGURE 1.

Figure 6:
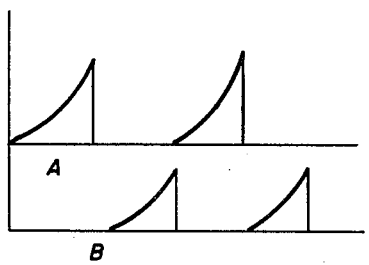
FIGURE 6 is a diagram showing the electrical output of the circuit of FIGURE 5.

In operation, as switch 88 is rotated to make connection between input terminal 90 and output terminal 92, potential is applied across condenser 102, and the condenser becomes charged. Thus the potential applied to brush 70 follows the form shown in FIGURE 6a, the potential increasing to some maximum value as the condenser charges, and then dropping to zero when switch 88 connects terminal 94 to ground. Similarly, the potential applied to brush 72 is as shown in FIGURE 6b. The rate of increase in potential may be adjusted by means of variable resistors 98 and 100. By this means, the rate of application of potential to the coupling members may be controlled, and the rate of acceleration and deceleration of drum 10 adjusted to any desired value.

Alternatively, the rates of acceleration and deceleration of drum 10, and the magnitude of shock thus imposed to test object 26, may be varied by changing the speeds of rotation of motors 60 and 62. The magnitude of the shock to which the test object is subject may also be varied by changing the magnitude of the potential applied to input terminal 90. If desired, the circuit comprising the condensers and variable resistances may be eliminated, and magnitude of shock controlled merely by varying the speed of rotation of the motors or by varying the magnitude of the potential applied to the switch input terminal 90. Ordinarily, voltages in the range of about 100 to 10,000 volts will be satisfactory, provided only that the magnitude of the applied voltage does not exceed the dielectric strength of the electric field responsive fluid film which exists between the drum 10 and the coupling members 32 and 34.

The frequency with which the test object is subjected to accelerating or decelerating forces may be varied by controlling the speed of electric motor 86, and thereby the frequency of switch 88. In general, it is desirable to provide switch means adapted to operate at frequencies ranging from about 1 cycle per second to about 40,000 cycles per second. Because of the extremely high response-speed of electric field responsive fluids, the device will operate satisfactorily at such high frequencies.

In constructing the apparatus of FIGURE 1, it is desirable to maintain the moment of inertia of the drum 10 at as low a value as possible, and to design the coupling members 32 and 34 such that they have moments of inertia several times that of the drum. In this way, the shock applied to motors 60 and 62 will be minimized. This latter result may also be accomplished by providing a slip drive, such as a belt drive or other friction drive, between the motors and the coupling members.

While the invention has been expalined with reference to a specific structure, it is evident that the invention can be practiced within the scope of the appended claims by employing various structural modifications which will be obvious to those skilled in this art. For example, the periphery of the drum 10 need not be cylindrical, provided only that the mating surfaces, such as surfaces 28 and 46, which cooperate to form an electric field responsive fluid coupling, are corresponding surfaces of revolution. A surface of revolution is a surface generated by rotating a line about an axis. Thus, where the line is a straight line, the surface of revolution generated will be a cylinder, a cone, or the surface of a disc, depending upon whether the line which is rotated to generate the surface lies parallel with, or some angle to, or perpendicular to the axis about which it is rotated. It is further evident that the drum 10 and coupling members 32 and 34 need not be fabricated of steel, or any other conductive metal, provided however that the surfaces 28, 44, 46, which are the effective coupling surfaces bounding the electric field responsive fluid film, which lies between the coupling members and the drum, are made of a conductive material. Thus, for example, the drum and coupling members may be fabricated of a suitable plastic, and the surfaces 28, 44, and 46 made conductive by depositing a thin film of metal thereon.

Electric field responsive fluid coupling designs other than that specifically illustrated may be employed. For example, couplings which comprise a conductive surface which is a surface of revolution, and a second surface spaced therefrom which comprises a plurality of electrodes, may be employed. Couplings of this type are described in U.S. patent application Serial No. 121,091, filed June 30, 1961, by Donald L. Klass and Vincent Brozowski. Electric field responsive fluid couplings of this type have an advantage in that it is not necessary that the conductive surface of the driven member be grounded, or electrically connected in any way whatsoever. The surface characteristics of the drum periphery and of the interior of the coupling members should be reasonably smooth and adapted to permit relative rotation of the coupling members and drum while maintaining a reasonably uniform annular space therebetween. It is preferred that the surfaces bounding the electric field responsive fluid film be fabricated with surface characteristics as defined in application Serial No. 150,344 filed November 6, 1961, by Donald L. Klass and Thomas Martinek. In this manner the efficiency of the electric field responsive fluid clutches is substantially enhanced.

While the apparatus can be utilized using any conventional electric field responsive fluid, the following formula is set forth as an example of one suitable fluid which may be used with either alternating or direct potential.

| | Percent |
|---|---|
| Refined lube oil | 30.5 |
| Silica | 50.0 |
| Glycerol monooleate | 5.5 |
| Ethylene glycol | 4.0 |
| 1-hydroxyethyl 2-heptadecenyl imidazoline | 10.0 |

The embodiments of the invention in which an exclusive property or privilege is claimed are defined as follows:

1. An apparatus of the character described comprising:
   (a) a rotatably supported hollow drum provided with first and second electric field fluid responsive coupling surfaces which are surfaces of revolution;
(b) means within said drum for supporting material to be operated upon;
(c) first and second electric field responsive fluid coupling members rotatably supported in co-axial relation with said drum and having surfaces of revolution spaced from said first and second coupling surfaces, respectively, said drum, first coupling member and second coupling member cooperating to form two electric field-responsive fluid couplings;
(d) means for rotating at least one coupling member;
(e) and automatic means for alternately electrically energizing one coupling substantially instantaneously upon de-energizing the other coupling.

2. An apparatus in accordance with claim 1 in which the interior of said drum is hollow and comprises a mixing vessel.

3. An apparatus in accordance with claim 1 in which the interior of said drum is hollow and includes means for supporting an object to be subjected to shock.

4. An apparatus in accordance with claim 3 in which said means for supporting is adapted to support an object axially with respect to said drum.

5. An apparatus in accordance with claim 3 in which said means for supporting is adapted to support a test object eccentrically with respect to said drum.

6. Apparatus in accordance with claim 1 including means for locking one of said coupling members in position to prevent rotation thereof.

7. An apparatus of the character described comprising:
(a) a hollow drum having an electrically conductive peripheral surface;
(b) means within said drum for supporting material to be operated upon;
(c) a pair of trunnions extending axially of said drum for rotatably supporting same;
(d) first and second coupling members each having an electrically conductive internal surface of revolution of radius greater than that of the peripheral surface of said drum, said members each being rotatably supported from one of said trunnions with said surfaces of revolution spaced from a portion of the peripheral surface of said drum;
(e) bearing means engaging the periphery of said drum for additionally supporting said first and second coupling members;

(f) said peripheral surface and said surface of revolution being maintained in electrically-insulated relationship;
(g) means for rotating at least one coupling member;
(h) and automatic means for alternately applying electrical potential between the interior surface of each coupling member and the peripheral surface of the drum, the potential between the interior surface of one coupling member and peripheral surface of the drum being applied substantially instantaneously upon discontinuing the potential between the surface of the other coupling member and peripheral surface of the drum.

8. An apparatus in accordance with claim 7 including means for rotating said coupling members in opposite directions.

9. An apparatus in accordance with claim 8 including means for rigidly supporting a test object within said drum.

10. An apparatus in accordance with claim 7 in which said coupling members are generally cup-shaped, the open ends of the cup-shaped coupling members being spaced from each other a distance not in excess of about 0.020 inch, and said open ends being of an electrically conductive material electrically connected to the surfaces of revolution of the respective coupling members to form a fluid seal.

11. An apparatus in accordance with claim 10 in which said drum and said coupling members are fabricated of an electrically conductive material, electrically insulating bearing means are provided between said trunnions and said coupling members, said bearing means engage the periphery of said drum supports, and said coupling members are in electrically insulated relationship with respect to each other and with respect to said drum.

12. An apparatus in accordance with claim 11 including a variable source of electrical potential and switch means for alternately connecting said source between said first coupling member and said drum and then between said second coupling member and said drum.

References Cited in the file of this patent
UNITED STATES PATENTS

| | | |
|---|---|---|
| 970,373 | Hemstreet | Sept. 13, 1910 |
| 2,180,608 | Pooler | Nov. 21, 1939 |
| 2,718,157 | Schaub | Sept. 20, 1955 |
| 2,886,151 | Winslow | May 12, 1959 |